(12) United States Patent
Numata et al.

(10) Patent No.: US 11,572,943 B2
(45) Date of Patent: Feb. 7, 2023

(54) HOUSING MEMBER FOR POWER TRANSMISSION DEVICE

(71) Applicants: JATCO Ltd, Fuji (JP); NISSAN MOTOR CO., LTD., Yokohama (JP)

(72) Inventors: Kazuya Numata, Isehara (JP); Yuuki Sakai, Kanagawa (JP); Yusuke Ienaka, Kanagawa (JP); Kazuhiro Nishimura, Kanagawa (JP); Tatsuya Kumagai, Ebina (JP); Masakazu Tamura, Fuji (JP)

(73) Assignees: JATCO LTD, Fuji (JP); NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 17/274,064

(22) PCT Filed: Sep. 25, 2019

(86) PCT No.: PCT/JP2019/037599
§ 371 (c)(1),
(2) Date: Mar. 5, 2021

(87) PCT Pub. No.: WO2020/084990
PCT Pub. Date: Apr. 30, 2020

(65) Prior Publication Data
US 2021/0348681 A1    Nov. 11, 2021

(30) Foreign Application Priority Data
Oct. 26, 2018   (JP) .............................. JP2018-202177

(51) Int. Cl.
*F16H 57/03*    (2012.01)
*F16H 57/02*    (2012.01)

(52) U.S. Cl.
CPC ... *F16H 57/03* (2013.01); *F16H 2057/02043* (2013.01)

(58) Field of Classification Search
CPC .................. F16H 57/03; F16H 57/029; F16H 2057/02043; F16H 2057/02008; F16H 2057/02047; F16H 2057/02091
See application file for complete search history.

(56) References Cited

U.S. PATENT DOCUMENTS 3,263,521 A * 8/1966 Muller ................... B23Q 1/015
                                                         74/606 R
4,506,561 A * 3/1985 Hayakawa ............ F16H 57/025
                                                         74/606 R
(Continued)

FOREIGN PATENT DOCUMENTS

EP    1113192 A1 *  7/2001  ........... F16H 57/035
EP    3001069 A1 *  3/2016  ............. F16H 57/03
(Continued)

*Primary Examiner* — Daniel D Yabut
(74) *Attorney, Agent, or Firm* — Foley & Lardner LLP

(57) ABSTRACT

A housing member for a power transmission device connected to a driving source via a torque converter housed in the housing member includes a torque converter side mating face closer to the torque converter. The torque converter side mating face has a single-wall structure and a double-wall structure, wherein two adjacent fastening regions are connected circumferentially by a wall in the single-wall structure, and wherein two adjacent fastening regions are connected circumferentially by each of two walls in the double-wall structure. The torque converter side mating face includes: an upper half region in which the double-wall structure has a greater proportion in area than the single-wall structure; and a lower half region in which the double-wall structure has a less proportion in area than the single-wall structure.

11 Claims, 5 Drawing Sheets

(56) References Cited

U.S. PATENT DOCUMENTS

| | | | |
|---|---|---|---|
| 4,969,422 A | 11/1990 | Ishikawa | |
| 8,166,848 B2 * | 5/2012 | Uozumi | F16H 57/025 74/606 R |
| 10,054,213 B1 | 8/2018 | Alexiou | |
| 2009/0078082 A1 * | 3/2009 | Poskie | F16H 57/025 74/606 R |
| 2015/0362024 A1 * | 12/2015 | Shimazaki | F16H 57/0473 192/112 |

FOREIGN PATENT DOCUMENTS

| | | | |
|---|---|---|---|
| FR | 3008157 A1 * | 1/2015 | B60K 17/08 |
| JP | H02-46012 U | 3/1990 | |
| JP | 2016-183753 A | 10/2016 | |
| WO | WO-2009034746 A1 * | 3/2009 | F16H 57/03 |

* cited by examiner

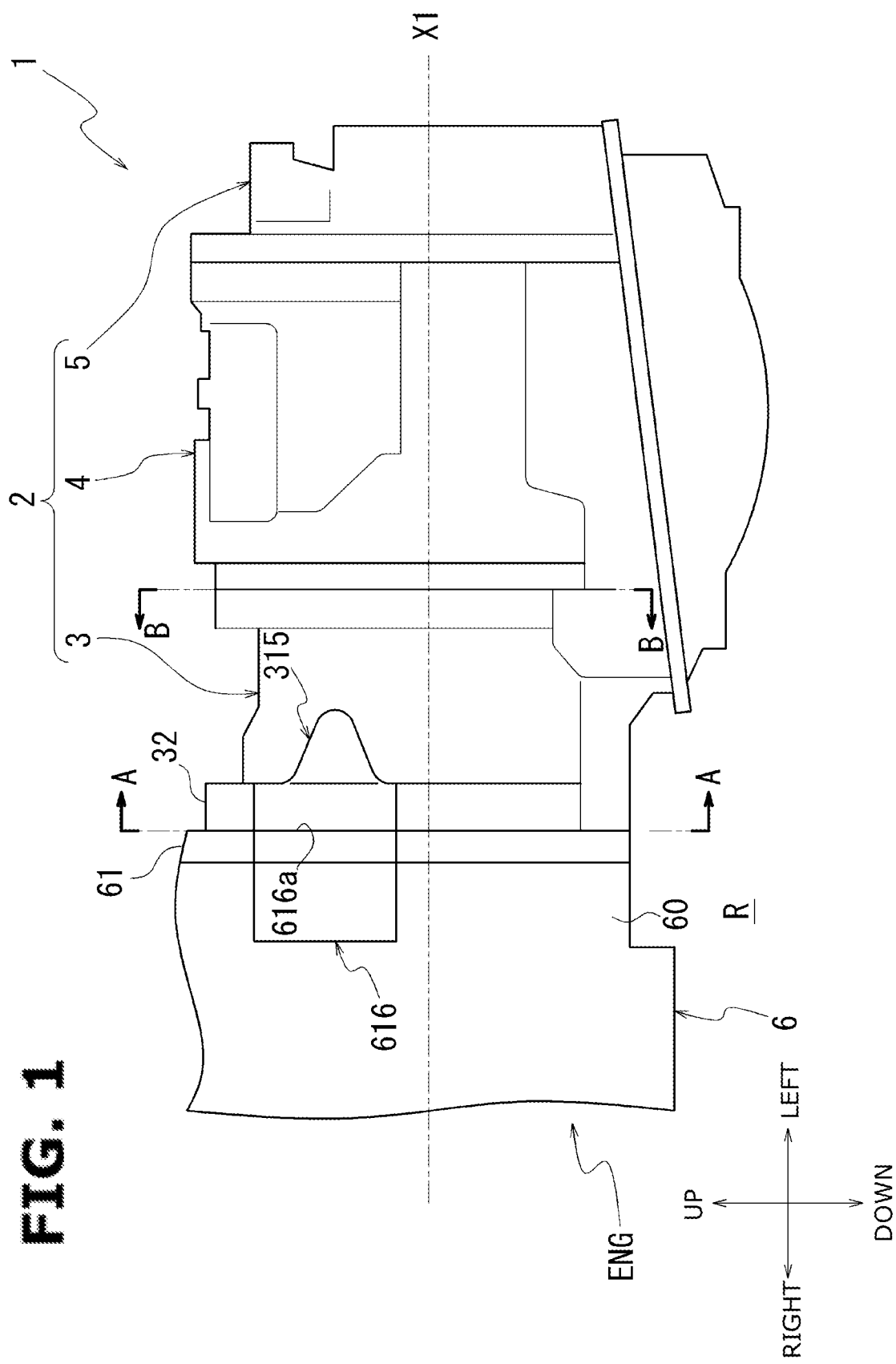

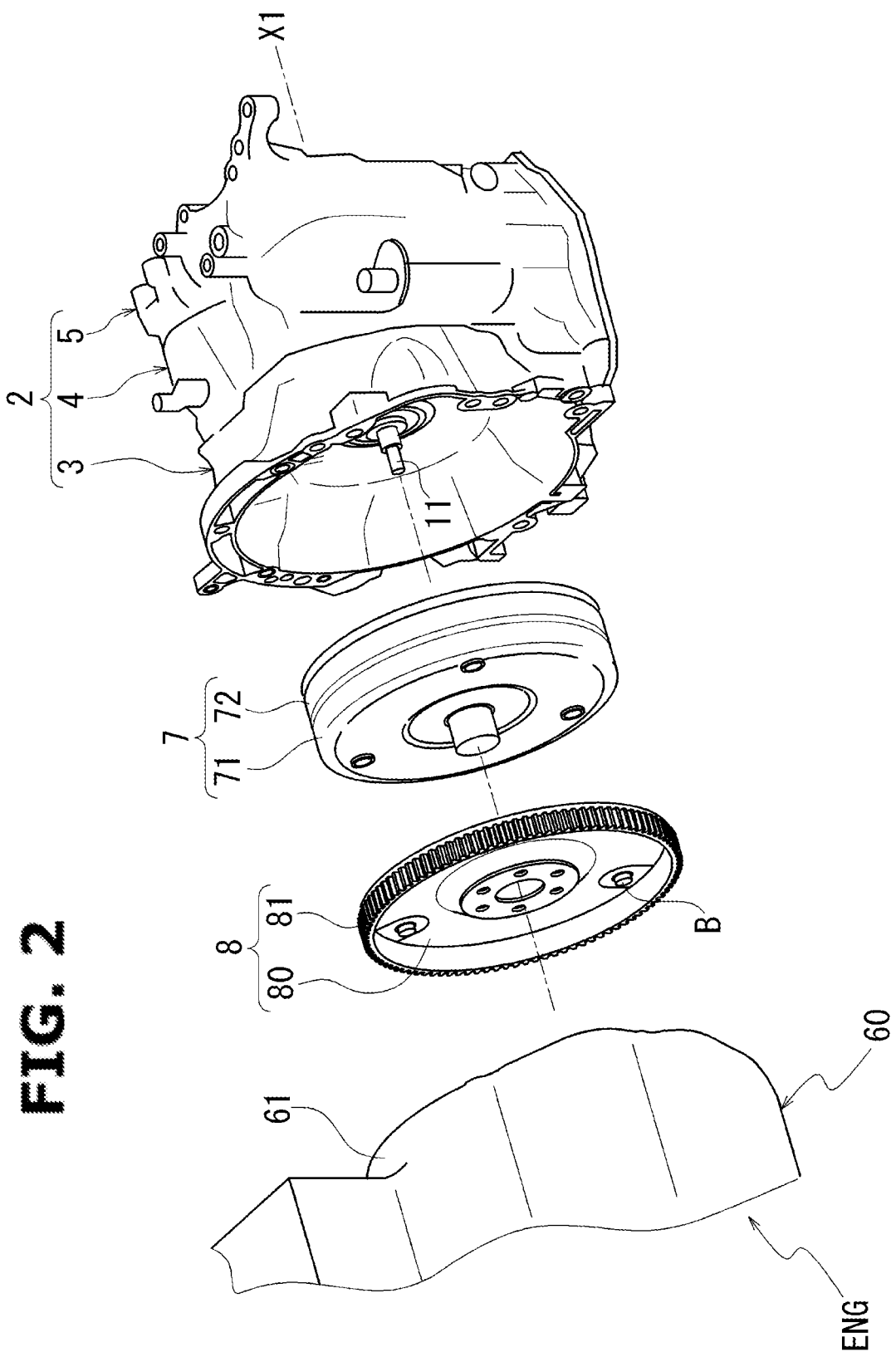

FIG. 4
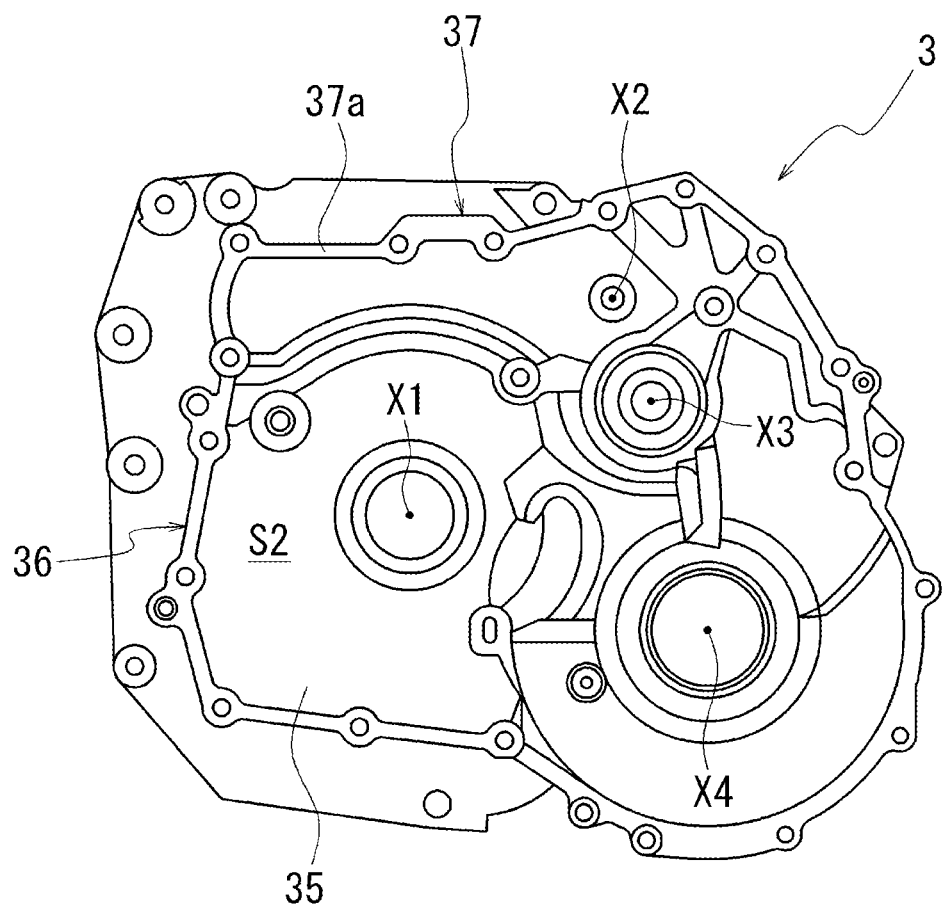
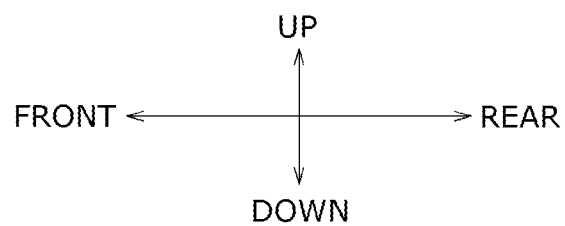

FIG. 5
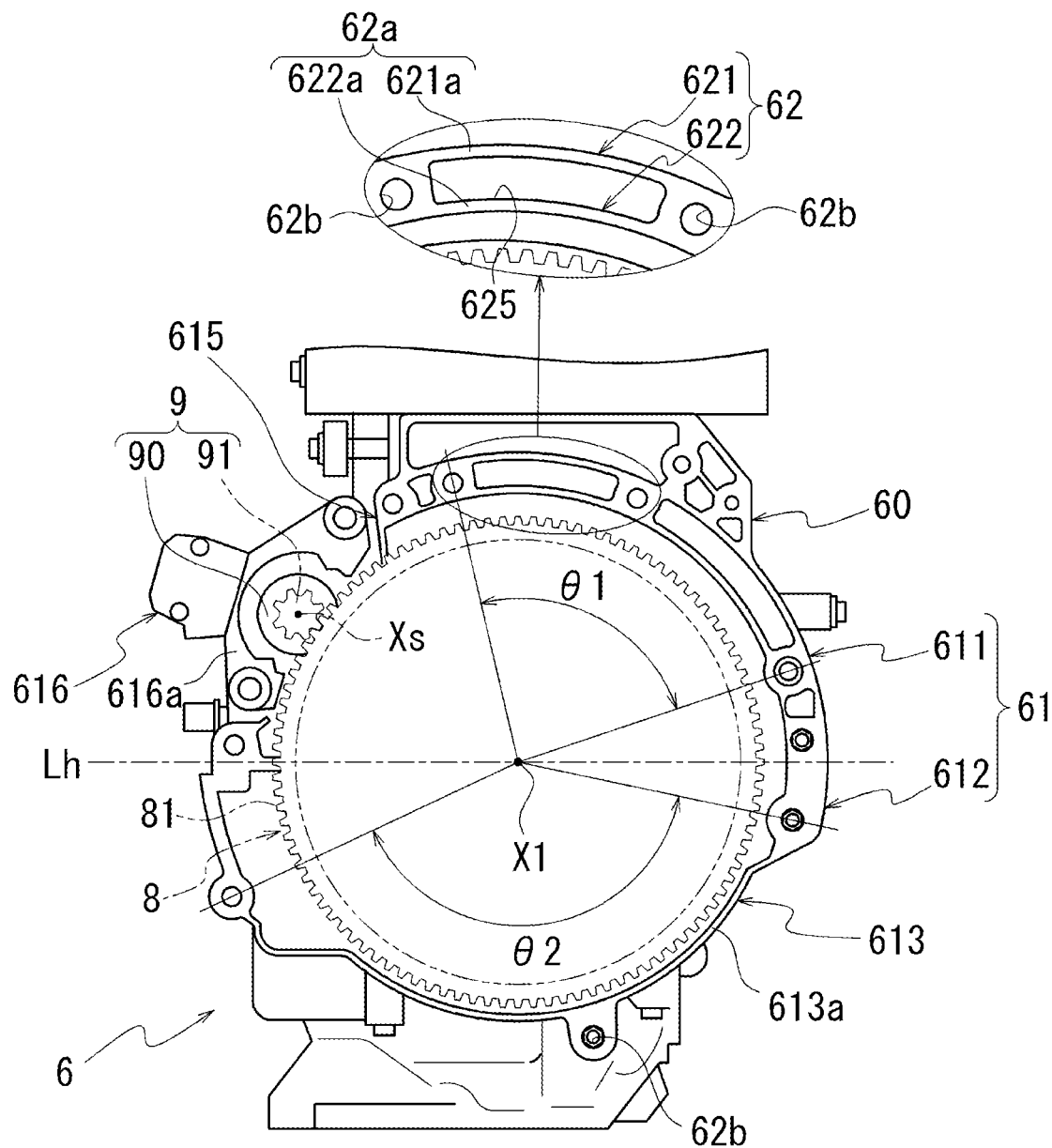
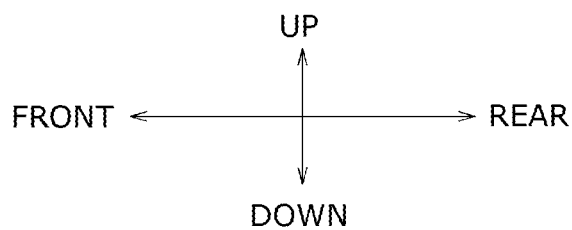

HOUSING MEMBER FOR POWER TRANSMISSION DEVICE

TECHNICAL FIELD

The present invention relates to a housing member for a power transmission device.

BACKGROUND ART

It is preferable that a mating face of a housing member of a power transmission device connected to a driving source side is highly rigid, so that the mating face is designed to have a certain thickness. However, increasing the thickness causes an increase in weight. In order to reduce the weight, it is conceivable to adopt a double-wall structure. Patent Document 1 discloses a housing member including a mating face based on the double-wall structure.

Although the double-wall structure contributes to weight reduction as compared with a single-wall structure being thick, it is desirable to further reduce the weight.

PRIOR ART DOCUMENT(S)

Patent Document(s)

Patent Document 1: JP 2016-183753 A

SUMMARY OF INVENTION

According to the present invention, a housing member for a power transmission device connected to a driving source, includes a driving source side mating face facing to the driving source; wherein the driving source side mating face has a single-wall structure and a double-wall structure, wherein two adjacent fastening regions are connected circumferentially by a wall in the single-wall structure, and wherein two adjacent fastening regions are connected circumferentially by each of two walls in the double-wall structure; and wherein the driving source side mating face includes: an upper half region in which the double-wall structure has a greater proportion in area than the single-wall structure; and a lower half region in which the double-wall structure has a less proportion in area than the single-wall structure.

The present invention serves for further weight reduction.

BRIEF DESCRIPTION OF DRAWINGS

FIG. 1 is a diagram illustrating a continuously variable transmission.
FIG. 2 is a diagram illustrating the continuously variable transmission.
FIG. 4 is a diagram illustrating the converter housing.
FIG. 5 is a diagram illustrating a cylinder block.

MODE(S) FOR CARRYING OUT INVENTION

Figure 3A:
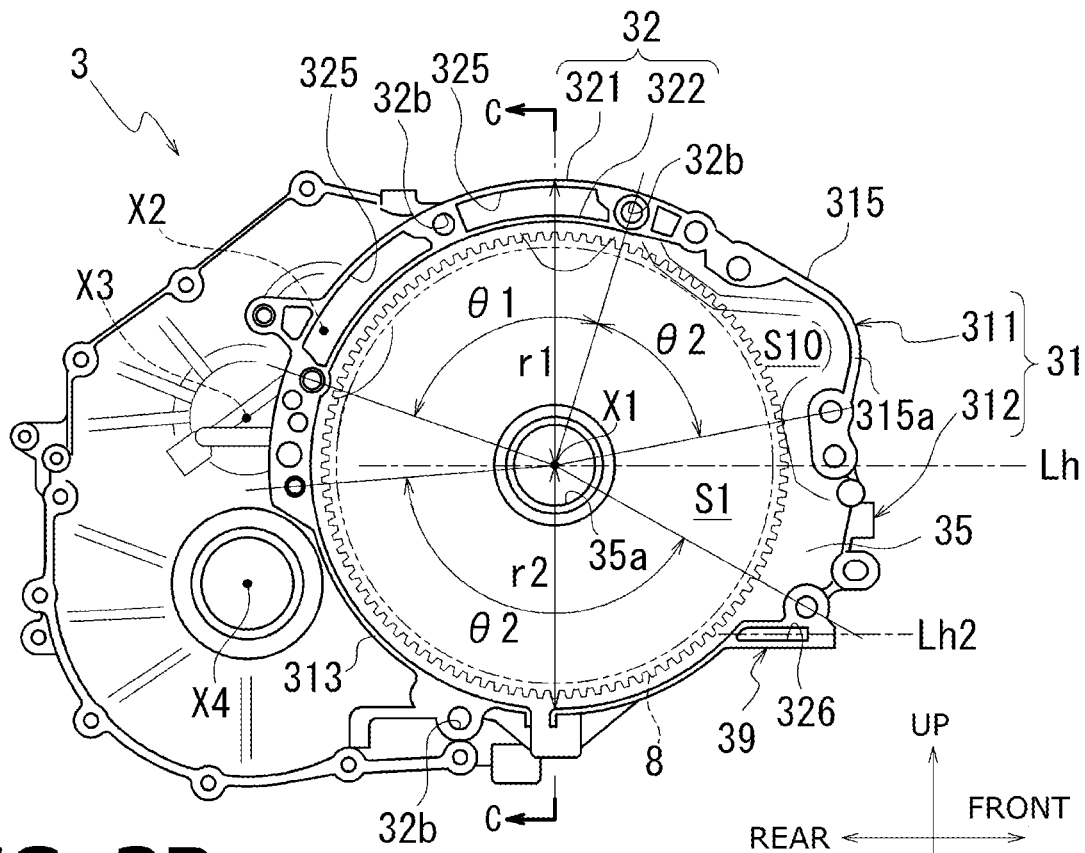
FIG. 3 (FIGS. 3A and 3B) is a diagram illustrating a converter housing.

The following describes a housing member for a power transmission device according to the present invention, which is exemplified as a converter housing of a continuously variable transmission for a vehicle.

FIG. 1 is a diagram illustrating a continuously variable transmission 1, schematically showing a side of the continuously variable transmission 1 as viewed from a front side of the vehicle. FIG. 2 is a diagram illustrating the continuously variable transmission 1, showing a transmission case 2, a torque converter 7, a drive plate 8, and a cylinder block 6 in a state where they are separated from each other in a direction of a rotation axis X1. In the following description regarding the drawings, upward and downward directions respectively mean upward and downward directions along a direction of gravity, and forward and rearward directions respectively mean forward and rearward directions from a passenger of the vehicle.

<Transmission Case 2> As shown in FIG. 1, the transmission case 2 of the continuously variable transmission 1 includes a converter housing 3, a case 4, and a side cover 5. In the converter housing 3, the torque converter 7 and the drive plate 8 are mounted (see FIG. 2). In the case 4, a transmission mechanism not shown is mounted.

The case 4 has a first end (on the left side in FIG. 1) connected to the converter housing 3, and a second end (on the right side in FIG. 1) connected to the side cover 5. The case 4 and the converter housing 3 are fixed to each other with bolts not shown. The case 4 and the side cover 5 are fixed to each other with bolts not shown.

The cylinder block 6 of an engine ENG is adjacent to a side of the converter housing 3 opposite to a side facing to the case 4. The continuously variable transmission 1 is attached to the cylinder block 6 in a state where the converter housing 3, the case 4, and the side cover 5 are layered with each other along the rotation axis X1 of a crankshaft not shown of the engine ENG.

With the arrangement described above, the engine ENG is mounted in an engine room R with the rotation axis X1 of the crankshaft aligned in a lateral direction of the vehicle. The continuously variable transmission 1 is arranged on the left side of the engine ENG (cylinder block 6) in the lateral direction of the vehicle (on the right side in FIG. 1).

The continuously variable transmission 1 receives input of a rotational driving force about the rotating shaft X1 from the crankshaft of the engine ENG. This rotational driving force is transmitted to the transmission mechanism via the torque converter 7, and after speed conversion by the transmission mechanism, is transmitted to driving wheels not shown.

In the transmission mechanism, a primary pulley not shown is arranged on an input shaft 11 (see FIG. 2) as a first shaft that rotates around the rotation axis X1. A secondary pulley not shown is arranged as a second shaft that rotates around a rotation axis X2 (see FIG. 3) parallel to the rotation axis X1. A belt not shown is wound around the primary pulley and the secondary pulley. A counter gear not shown is arranged as a third shaft that rotates around a rotation axis X3 (see FIG. 3) parallel to the rotation axis X1. A final gear not shown is arranged as a fourth shaft that rotates around a rotation axis X4 (see FIG. 3) parallel to the rotation axis X1.

The rotational driving force of the engine ENG is transmitted to the input shaft 11 via rotation of the torque converter 7. The rotational driving force transmitted to the input shaft 11 is converted in speed at the second shaft (secondary pulley), and then transmitted to the third shaft (counter gear) and the fourth shaft (final gear) in this order.

<Torque Converter 7> As shown in FIG. 2, the torque converter 7 is connected to the input shaft 11 while a front cover 71 and a pump impeller 72 are layered along the rotation axis X1. The front cover 71 and the pump impeller 72 are configured to rotate around the rotation axis X1 with respect to each other.

The front cover 71 is arranged to face to the cylinder block 6 in the direction of the rotation axis X1. The drive plate 8 is attached to the front cover 71 in the direction of the rotation axis X1. The pump impeller 72 is arranged to face to the case 4 in the direction of the rotation axis X1. The pump impeller 72 is fit over the input shaft 11 by insertion.

The drive plate 8 includes a disk-shaped bottom wall part 80, and a peripheral wall part 81 that surrounds an entire outer periphery of the bottom wall part 80. The peripheral wall part 81 has an outer peripheral surface geared entirely (in the following description, the peripheral wall part 81 is also referred to as gear part 81). The gear part 81 is larger in outer diameter than the torque converter 7. The gear part 81 meshes with a gear part 91 of a starter motor 9 described below (see FIG. 5).

The drive plate 8 is fixed to the front cover 71 with bolts B, and is structured to rotate integrally with the front cover 71 around the rotation axis X1. The drive plate 8 is connected to the crankshaft at the side opposite to the side facing to the torque converter 7 in the direction of the rotation axis X1. The torque converter 7 and the drive plate 8 are housed in the converter housing 3.

Figure 3B:
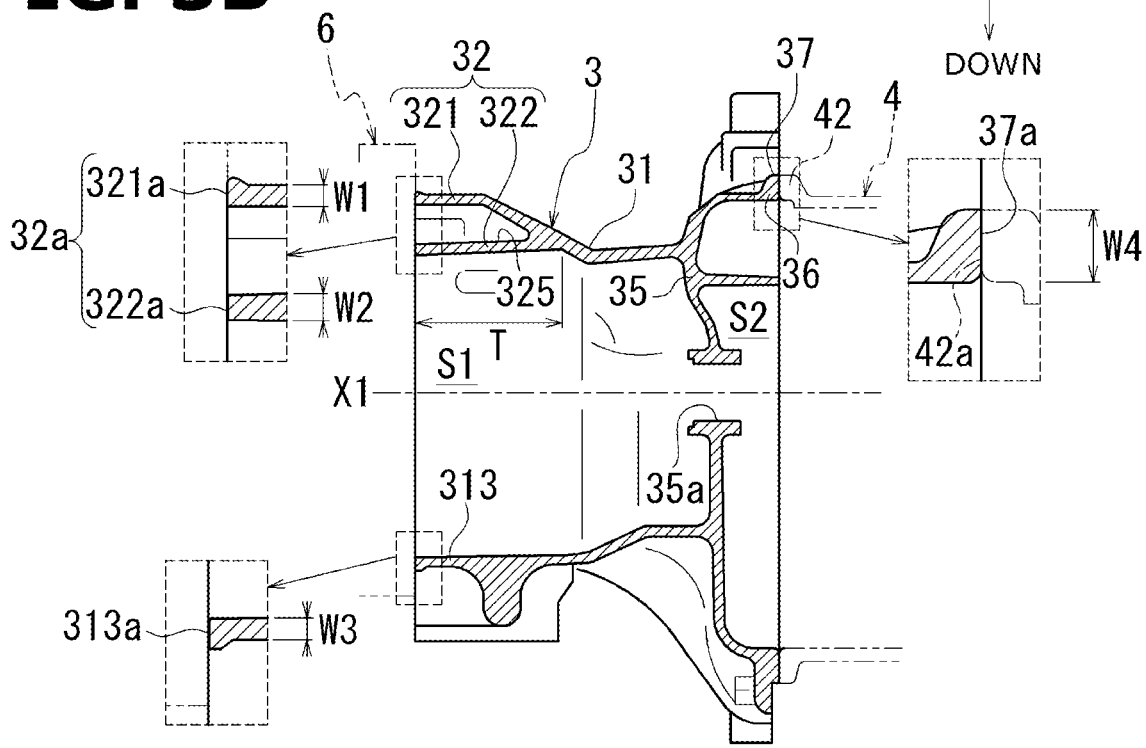

<Converter Housing 3> FIG. 3 is a diagram illustrating the converter housing 3, where FIG. 3A is a cross-sectional view taken along a line A-A in FIG. 1, and the drive plate 8 is represented by imaginary lines, and FIG. 3B is a cross-sectional view of the converter housing 3 taken along a line C-C in FIG. 3A. FIG. 4 is a diagram illustrating the converter housing 3, and is a sectional view taken along a line B-B in FIG. 1. An oil pan is omitted.

As shown in FIG. 3B, the converter housing 3 has an internal space where an intermediate wall part 35 is disposed. When the converter housing 3 is attached to the cylinder block 6, the intermediate wall part 35 is orthogonal to the rotation axis X1.

The internal space of the converter housing 3 is divided by the intermediate wall part 35 into a space S1 closer to the cylinder block 6 and a space S2 closer to the case 4 in the direction of the rotation axis X1.

The intermediate wall part 35 is formed with a through hole 35a in a region intersecting with the rotation axis X1. The through hole 35a provides communication between the space S1 and the space S2. The input shaft 11 is inserted into the through hole 35a from the case 4, and connected to the torque converter 7 in the space S1 (see FIG. 2).

The intermediate wall part 35 is provided with an annular wall 31 extending circumferentially around the rotation axis X1. The annular wall 31 extends away from the case 4 in direction of the rotation axis X1 (see FIG. 3B).

As viewed in the direction of the rotation axis X1, the annular wall 31 is formed to extend along the outer periphery of the drive plate 8. The space S1 is a recess surrounded by the intermediate wall part 35 and the annular wall 31.

<Annular Wall 31> The region of the converter housing 3 surrounded by the annular wall 31 is open to the cylinder block 6. The annular wall 31 has a divergent shape having an opening diameter that increases away from the intermediate wall part 35 (see FIG. 3B).

As shown in FIG. 3A, the annular wall 31 has a region 311 above a horizontal line Lh passing through the rotation axis X1 (henceforth, simply referred to as upper region 311) in which a bulging wall part 315 is formed on the vehicle forward side and bulges outward away from the drive plate 8 in a radial direction of the rotation axis X1. In the space S1, the bulging wall part 315 and the intermediate wall part 35 surround a region serving as a starter motor accommodation space S10 in which the starter motor 9 described below is accommodated.

The annular wall 31 further has a region 312 below the horizontal line Lh passing through the rotation axis X1 (henceforth, simply referred to as lower region 312) in which a water hose not shown connected to an oil cooler not shown passes on the vehicle forward side. The water hose is fixed in the lower region 312 by a bracket not shown. A protruding support portion 39 for supporting the bracket is locally formed in the lower region 312. The protruding support portion 39 protrudes from the outer periphery of the annular wall 31 toward the front side of the vehicle along a straight line Lh2 parallel to the horizontal line Lh.

When the engine ENG is driven, the rotational driving force is transmitted to the continuously variable transmission 1, so that the engine ENG and the continuously variable transmission 1 vibrate and cause vibration noise.

The present inventor(s) have made diligent studies, and have found the following facts regarding the vibration noise.

<a> The fact that stress is concentrated at a part of connection between the engine ENG and the converter housing 3.

<b> The fact that the vibration noise becomes louder as the rigidity of the connection part decreases.

<c> The fact that the connection part has a region that can serve significantly to reduce the vibration noise and a region that can serve less significantly to reduce the vibration noise.

<d> The fact that region that can serve significantly to reduce the vibration noise is the region 311 of the connection part above the rotation axis X1 in the vertical direction.

<e> The fact that the region 312 below the rotation axis X1 in the vertical direction can serve less significantly to reduce the vibration noise in contrast to the fact (d).

Based on the facts described above, it has been found that the region where the rigidity should be enhanced in particular in order to reduce the vibration noise is the upper region 311 in the vertical direction.

In view of the foregoing, as shown in FIGS. 3A and 3B, the upper region 311 of the annular wall 31 is formed with a flange part 32. The flange part 32 has a mating face 32a to mate with the cylinder block 6. The flange part 32 is not formed in the bulging wall part 315 where the annular wall 31 extends as it is. The bulging wall part 315 has at its tip end a mating face 315a to mate with the cylinder block 6.

Furthermore, the flange part 32 is not formed in the lower region 312 of the annular wall 31, and the annular wall 31 extends as it is to form an ordinary wall 313. The ordinary wall 313 has at its tip end a mating face 313a to mate with the cylinder block 6.

The mating face 32a of the flange part 32, the mating face 315a of the bulging wall part 315, and the mating face 313a of the ordinary wall 313 are flat and orthogonal to the rotation axis X1 and flush with each other.

Bolt holes 32b are opened in the mating face 32a of the flange part 32 and the mating face 313a of the ordinary wall 313. The bolt holes 32b are arranged at predetermined intervals in the circumferential direction around the rotation axis X1.

The flange part 32 is formed to have a predetermined thickness in the direction of the rotation axis X1. Furthermore, the flange part 32 is formed with lightening holes 325 except around the bolt holes 32b. The lightening holes 325 are opened in the mating face 32a.

The region of the flange part 32 where the lightening holes 325 are formed has a double-wall structure composed of an outer wall 321 outside and an inner wall 322 inside with respect to the lightening hole 325 in the radial direction of the rotating shaft X1. The mating face 32a is composed of a mating face 321a of the outer wall 321 and a mating face 322a of the inner wall 322.

In the double-wall structure, the bolt holes 32b are located between the outer wall 321 and the inner wall 322 in the radial direction of the rotation axis X1. In the circumferential direction, the bolt holes 32b and 32b adjacent to each other are connected by each of the outer wall 321 and the inner wall 322.

The bulging wall part 315 and the lower region 312 each have a single-wall structure composed of the ordinary wall 313 having the same thickness as the annular wall 31 except around the bolt holes 32b. As shown in FIG. 3B, the thickness W3 of the bulging wall part 315 and the ordinary wall 313 in the radial direction of the rotating shaft X1 is set smaller than the sum of the thickness W1 of the outer wall 321 and the thickness W2 of the inner wall 322 (W3<W1+W2). As shown in FIG. 3A, in the single-wall structure, the bolt holes 32b and 32b adjacent to each other in the circumferential direction are connected by the bulging wall part 315 or the ordinary wall 313.

As shown in FIG. 3A, in the vertical direction, the radius r1 from the rotation axis X1 to the outer wall 321 is set greater than the radius r2 from the rotation axis X1 to the ordinary wall 313 (r1>r2).

Furthermore, in the present embodiment, in the upper region 311, the double-wall structure has a greater proportion in area (angular range θ1) than the single-wall structure (angular range θ2) in the circumferential direction around the rotation axis X1 (θ1>θ2). In the lower region 312, the proportion in area (angular range θ1) of the double-wall structure is set to zero.

The lower region 312 is not limited to such a configuration that the double-wall structure has a zero proportion in area (angular range θ1). The proportion in area (angular range θ1) of the double-wall structure may be set at least smaller than the single-wall structure (angular range θ2) in the circumferential direction around the rotation axis X1 (θ1<θ2).

As described above, the flange part 32 based on the double-wall structure is provided in the upper region 311 that can serve more significantly to reduce the vibration noise. This allows to reduce the weight while ensuring the rigidity. The lower region 312, which can serve less significantly to reduce the vibration noise, is not provided with the flange part 32, but based on the single-wall structure in which the ordinary wall 313 has the same thickness as the annular wall 31. This serves to further reduce the weight.

If the upper region 311 contains a part that can serve less significantly to reduce the vibration noise, the part of the upper region 311 may be implemented by the single-wall structure to reduce the weight. The bulging wall part 315 is formed in the upper region 311 but is based on the single-wall structure, in view of requirements about mounting position of the starter motor 9 and mountability to the vehicle (see FIG. 3A).

The protruding support portion 39 is formed with a lightening hole 326 (see FIG. 3A). The protruding support portion 39 may also appear to have a double-wall structure. However, the protruding support portion 39 is intended to ensure the rigidity of the bracket for supporting the water hose, and is not intended to ensure the rigidity for reducing the vibration noise. Therefore, the protruding support portion 39 has a different structure than the double-wall structure for connection between the bolt holes 32b and 32b.

<Circular Wall 36> As shown in FIGS. 3B and 4, the space S2 of the case 4 is a region in a recess formed by surrounding the intermediate wall part 35 with the annular wall 36. The annular wall 36 is formed at the intermediate wall part 35, and extends away from the cylinder block 6 in the direction of the rotation axis X1.

The region of the converter housing 3 surrounded by the annular wall 36 is open to the case 4 (see FIG. 3B). The periphery of the opening of the annular wall 36 is formed entirely with a flange part 37 over the entire circumference. The flange part 37 has a thickness W4 in a direction orthogonal to the circumferential direction. The thickness W4 is set larger than the thickness W1 of the outer wall 321 of the annular wall 31, the thickness W2 of the inner wall 322, and the thickness W3 of the ordinary wall 313 (W4>W1, W2, W3).

The flange part 37 has a mating face 37a to mate with the case 4. The mating face 37a is a flat surface orthogonal to the rotation axis X1. The mating face 37a is in contact with a mating face 42a of a flange part 42 of the case 4 (see imaginary lines) entirely in the circumferential direction around the rotation axis X1.

The internal space surrounded by the case 4 and the converter housing 3 accommodates a part of the transmission mechanism not shown, and also encloses an oil (CVTF) for lubricating the transmission mechanism.

The flange part 37 has a single-wall structure in which no lightening hole is formed as the lightening holes 325 of the flange part 32. Furthermore, there is no region where the flange part 37 is not formed. Therefore, the flange part 37 is in contact with the flange part 42 of the case 4 by the entire thickness W4. This results in a large contact area, and thereby ensures sealing performance. This serves to prevent the oil from leaking from a boundary between the flange part 37 and the flange part 42 of the case 4.

<Cylinder Block 6> FIG. 5 is a diagram illustrating the cylinder block 6, as viewed from the torque converter 7 in FIG. 2. In FIG. 5, the drive plate 8 and the starter motor 9 are shown by imaginary lines.

As shown in FIG. 5, the cylinder block 6 has a body 60 in which the crankshaft is housed. The body 60 has an open face facing the converter housing 3 in the direction of the rotation axis X1. The opening of the body 60 is surrounded by a peripheral wall part 61.

The peripheral wall part 61 has a region 611 above the horizontal line Lh passing through the rotation axis X1 (henceforth, simply referred to as upper region 611) in which a cutout portion 615 is partly formed on the vehicle forward side. The starter motor 9 described below is accommodated in the cutout portion 615, and the cutout portion 615 is covered with a cover member 616 from outside in the radial direction of the rotating shaft X1 (see FIG. 1).

The upper region 611 of the peripheral wall part 61 is formed with a thicker portion 62 in the radial direction of the rotation axis X1 than the lower region 612. The thicker portion 62 has a mating face 62a to mate with the flange part 32 of the converter housing 3. Furthermore, as shown in FIG. 5, the lower region 612 of the peripheral wall part 61 is not provided with the thicker portion 62, and the peripheral wall part 61 extends as it is to form an ordinary wall 613. The ordinary wall 613 has an end face as a mating face 613a to mate with the ordinary wall 313 of the converter housing 3. Furthermore, the cover member 616 has a mating face 616a to mate with the bulging wall part 315 of the converter housing 3 (see FIG. 1).

The mating face 62a of the thicker portion 62, the mating face 613a of the ordinary wall 613, and the mating face 616a of the cover member 616 are flat and orthogonal to the rotation axis X1 and flush with each other.

Bolt holes 62b are opened in the mating face 62a of the thicker portion 62 and the mating face 613a of the ordinary wall 613. In the circumferential direction of the rotation axis X1, the bolt holes 62b are formed at positions corresponding to respective ones of the bolt holes 32b of the converter housing 3.

The thicker portion 62 is formed with lightening holes 625 except around the bolt holes 62b. The lightening holes 625 are opened in the mating face 62a.

The region of the thicker portion 62 where the lightening holes 625 are formed has a double-wall structure composed of an outer wall 621 outside and an inner wall 622 inside with respect to the lightening hole 625 in the radial direction of the rotating shaft X1. The mating face 62a is composed of a mating face 621a of the outer wall 621 and a mating face 622a of the inner wall 622.

In the double-wall structure, the bolt holes 62b are located between the outer wall 621 and the inner wall 622 in the radial direction of the rotation axis X1. In the circumferential direction, the bolt holes 62b and 62b adjacent to each other are connected by each of the outer wall 621 and the inner wall 622.

The lower region 612 has a single-wall structure composed of the ordinary wall 613 having the same thickness as the peripheral wall part 61 except around the bolt holes 62b.

The thicknesses of the thicker portion 62 (outer wall 621 and inner wall 622) of the cylinder block 6 corresponds to the thicknesses W1 and W2 of the flange part 32 (outer wall 321 and inner wall 322) of the converter housing 3 (see FIG. 3B).

The thicker portion 62 (outer wall 621, inner wall 622) of the cylinder block 6 has a proportion in area (angular range) in the circumferential direction around the rotation axis X1 which corresponds to the proportion in area (angular range θ1, see FIG. 3A) of the flange part 32 (outer wall 321, inner wall 322) of the converter housing 3 in the circumferential direction around the rotation axis X1.

The thickness of the ordinary wall 613 of the cylinder block 6 and the proportion in area (range) of the ordinary wall 613 of the cylinder block 6 in the circumferential direction around the rotating shaft X1 correspond to the thickness W3 of the ordinary wall 313 of the converter housing 3 and the proportion in area (angular range θ2, see FIG. 3A) of the ordinary wall 313 of the converter housing 3 in the circumferential direction around the rotating shaft X1.

<Starter Motor 9> The starter motor 9, which is housed in the cutout portion 615 of the peripheral wall part 61, includes a motor part 90 and the gear part 91. The gear part 91 is arranged at a position offset from the motor part 90 toward the converter housing 3 in the direction of the rotation axis X1 (out of the page of FIG. 5). The gear part 91 rotates about a rotation axis Xs parallel to the rotation axis X1.

With the converter housing 3 attached to the cylinder block 6, the gear part 91 extends into the starter motor accommodation space S10 of the converter housing 3 (see FIG. 3). The gear part 91 meshes with the gear part 81 of the drive plate 8 in the starter motor accommodation space S10 (see FIG. 5).

The converter housing 3 of the continuously variable transmission 1 according to the present embodiment is configured as follows: <1> A converter housing 3 (housing member) for a continuously variable transmission 1 (power transmission device) connected to a cylinder block 6 of an engine ENG (driving source), includes an annular wall 31 including a tip face (driving source side mating face facing to the driving source); wherein the tip face has a single-wall structure and a double-wall structure, wherein two adjacent bolt holes 32b (fastening regions) are connected circumferentially around a rotation axis X1 by an ordinary wall 313 in the single-wall structure, and wherein two adjacent bolt holes 32b (fastening regions) are connected circumferentially around the rotation axis X1 by each of an outer wall 321 and an inner wall 322 (two walls) in the double-wall structure; and wherein the annular wall 31 includes: an upper region 311 above a horizontal line Lh passing through the rotation axis X1 (upper half region) in which the double-wall structure has a greater proportion (θ1) in angular range (in area) than the single-wall structure (θ2); and a lower region 312 below the horizontal line Lh (lower half region) in which the double-wall structure has a less proportion (θ1) in angular range (in area) than the single-wall structure (θ2).

This configuration serves to set large the proportion in area (total circumferential length) of the double-wall structure in the upper region 311 where rigidity improvement is highly required, and thereby increase the rigidity and suppress the vibration noise. The configuration also serves to set large the proportion in area of the single-wall structure in the lower region 312 where rigidity requirement is less required than the upper region 311, and thereby reduce the weight.

The converter housing 3 of the continuously variable transmission 1 according to the present embodiment is configured as follows: <2> The ordinary wall 313 of the single-wall structure has a radial thickness W3 smaller than a sum (W1+W2) of radial thicknesses of the outer wall 321 and the inner wall 322 of the double-wall structure.

This configuration serves to form the thin ordinary wall 313 of the single-wall structure and thereby further reduce the weight.

The converter housing 3 of the continuously variable transmission 1 according to the present embodiment is configured as follows: <3> The proportion of the double-wall structure in the lower region 312 of the annular wall 31 is equal to zero.

This configuration serves to further reduce the weight.

The converter housing 3 of the continuously variable transmission 1 according to the present embodiment is configured as follows: <4> A protruding support portion 39 is formed locally in a mating face 313a of the ordinary wall 313 (in the lower half region of the driving source side mating face), and structured to support a water hose (hose) connected to a cooler.

It is preferable that the structure for supporting the water hose connected to the cooler is provided in the lower region 312 of the annular wall 31. Accordingly, the converter housing 3 is required to have a certain degree of rigidity to support the water hose. However, increasing the rigidity causes an increase in the weight of the converter housing 3. Therefore, the configuration described above serves to suppress the weight increase of the converter housing 3 as small as possible.

The converter housing 3 of the continuously variable transmission 1 according to the present embodiment is configured as follows: <5> The protruding support portion 39 contains a lightening hole 326 (cavity).

This configuration serves to reduce the weight of the converter housing 3.

The converter housing 3 of the continuously variable transmission 1 according to the present embodiment is configured as follows: <6> A mating face 37a of a flange part 37 of an annular wall 36 (a mating face facing away from the driving source) is formed entirely circumferentially by the single-wall structure.

It is not required to enclose fluid (oil) inside the annular wall 31 (the space S1) so that sealing is not required, but it is required to enclose fluid inside the annular wall 36 (the space S2). Therefore, the mating face 37*a* of the flange part 37 is required to be sealed. If the mating face 37*a* of the flange part 37 has a double-wall structure, the sealing performance is lowered. In view of the foregoing, the configuration described above for higher sealing performance serves to enclose the fluid.

The converter housing 3 of the continuously variable transmission 1 according to the present embodiment is configured as follows: <7> The single-wall structure of the mating face 37*a* of the flange part 37 of the annular wall 36 is greater in wall radial thickness (W4) than the single-wall structure of the mating face 313*a* of the ordinary wall 313 of the annular wall 31 (W3).

This configuration serves to enhance the sealing performance of the mating face 37*a* of the flange part 37.

In the present embodiment, the power transmission device is exemplified as a continuously variable transmission for a vehicle. However, the power transmission device according to the present invention is not limited to a continuously variable transmission for a vehicle. In other words, the present invention is also applicable to a device including a gear train composed of a plurality of gears, wherein at least one gear is configured to scoop up oil in a case of the gear train. For example, such a device is a speed reducer that decelerates inputted rotation and outputs the decelerated rotation.

Although the embodiment of the present invention has been described above, the present invention is not limited to the configurations shown in the embodiment, but may be modified as appropriate within the scope of the technical substance of the invention.

The present application is a 371 Application of PCT/JP2019/037599, filed Sep. 25, 2019, which claims priority to Japanese Patent Application No. 2018-202177 filed with the Japan Patent Office on Oct. 26, 2018, all of the contents of each of which are hereby incorporated by reference.

The invention claimed is:

1. A housing member comprising:
    an oil-free space for accommodating a torque converter; and
    a torque converter side mating face closer to the torque converter;
    wherein the housing member is configured for a power transmission device connected to a driving source via the torque converter housed in the housing member;
    wherein the torque converter side mating face has a single-wall structure and a double-wall structure, wherein two adjacent fastening regions are connected circumferentially by a wall in the single-wall structure, and wherein two adjacent fastening regions are connected circumferentially by each of two walls in the double-wall structure; and
    wherein the torque converter side mating face includes:
        an upper half region in which the double-wall structure has a greater proportion in area than the single-wall structure; and
        a lower half region in which the double-wall structure has a less proportion in area than the single-wall structure.

2. The housing member as claimed in claim 1, wherein the wall of the single-wall structure has a radial thickness smaller than a sum of radial thicknesses of the two walls of the double-wall structure.

3. The housing member as claimed in claim 1, wherein the proportion of the double-wall structure in the lower half region is equal to zero.

4. The housing member as claimed in claim 1, further comprising a protruding support portion formed locally in the lower half region of the torque converter side mating face, and structured to support a hose connected to a cooler.

5. The housing member as claimed in claim 4, wherein the protruding support portion contains a cavity.

6. The housing member as claimed in claim 1, further comprising a second mating face facing away from the torque converter, wherein the second mating face is formed entirely circumferentially by the single-wall structure.

7. The housing member as claimed in claim 6, wherein the single-wall structure of the second mating face is greater in wall radial thickness than the single-wall structure of the torque converter side mating face.

8. A housing member comprising a torque converter side mating face closer to a torque converter;
    wherein the housing member is configured for a power transmission device connected to a driving source via the torque converter housed in the housing member;
    wherein the torque converter side mating face has a single-wall structure and a double-wall structure, wherein two adjacent fastening regions are connected circumferentially by a wall in the single-wall structure, and wherein two adjacent fastening regions are connected circumferentially by each of two walls in the double-wall structure;
    wherein the torque converter side mating face includes:
        an upper half region in which the double-wall structure has a greater proportion in area than the single-wall structure; and
        a lower half region in which the double-wall structure has a less proportion in area than the single-wall structure; and
    wherein the wall of the single-wall structure has a radial thickness smaller than a sum of radial thicknesses of the two walls of the double-wall structure.

9. A housing member comprising a torque converter side mating face closer to a torque converter;
    wherein the housing member is configured for a power transmission device connected to a driving source via the torque converter housed in the housing member;
    wherein the torque converter side mating face has a single-wall structure and a double-wall structure, wherein two adjacent fastening regions are connected circumferentially by a wall in the single-wall structure, and wherein two adjacent fastening regions are connected circumferentially by each of two walls in the double-wall structure;
    wherein the torque converter side mating face includes:
        an upper half region in which the double-wall structure has a greater proportion in area than the single-wall structure; and
        a lower half region in which the double-wall structure has a less proportion in area than the single-wall structure; and
    wherein the housing member further comprises a protruding support portion formed locally in the lower half region of the torque converter side mating face, and structured to support a hose connected to a cooler.

10. The housing member as claimed in claim 9, wherein the protruding support portion contains a cavity.

11. A housing member comprising a torque converter side mating face closer to a torque converter;
   wherein the housing member is configured for a power transmission device connected to a driving source via the torque converter housed in the housing member;
   wherein the torque converter side mating face has a single-wall structure and a double-wall structure, wherein two adjacent fastening regions are connected circumferentially by a wall in the single-wall structure, and wherein two adjacent fastening regions are connected circumferentially by each of two walls in the double-wall structure;
   wherein the torque converter side mating face includes:
      an upper half region in which the double-wall structure has a greater proportion in area than the single-wall structure; and
      a lower half region in which the double-wall structure has a less proportion in area than the single-wall structure;
   wherein the housing member further comprises a second mating face facing away from the torque converter, wherein the second mating face is formed entirely circumferentially by the single-wall structure; and
   wherein the single-wall structure of the second mating face is greater in wall radial thickness than the single-wall structure of the torque converter side mating face.

* * * * *